(12) United States Patent
Sprague et al.

(10) Patent No.: US 7,365,892 B2
(45) Date of Patent: Apr. 29, 2008

(54) SCANNED LIGHT DISPLAY SYSTEM USING ARRAY OF COLLIMATING ELEMENTS IN CONJUNCTION WITH LARGE NUMERICAL APERTURE LIGHT EMITTER ARRAY

(75) Inventors: Randall B. Sprague, Carnation, WA (US); Mathew D. Watson, Bellevue, WA (US); Thomas W. Montague, Mercer Island, WA (US); Christopher A. Wiklof, Everett, WA (US)

(73) Assignee: Microvision, Inc., Redmond, WA (US)

( * ) Notice: Subject to any disclaimer, the term of this patent is extended or adjusted under 35 U.S.C. 154(b) by 120 days.

(21) Appl. No.: 11/404,308

(22) Filed: Apr. 14, 2006

(65) Prior Publication Data

US 2006/0187512 A1 Aug. 24, 2006

Related U.S. Application Data

(63) Continuation of application No. 11/200,484, filed on Aug. 8, 2005.

(60) Provisional application No. 60/610,911, filed on Sep. 17, 2004.

(51) Int. Cl.
G02B 26/08 (2006.01)

(52) U.S. Cl. .................................................. 359/204

(58) Field of Classification Search ......... 359/204–218
See application file for complete search history.

(56) References Cited

U.S. PATENT DOCUMENTS

| | | | |
|---|---|---|---|
| 4,902,083 A | 2/1990 | Wells | 350/6.6 |
| 4,934,773 A | 6/1990 | Becker | 350/6.6 |
| 5,003,300 A | 3/1991 | Wells | 340/705 |
| 5,023,905 A | 6/1991 | Wells et al. | 379/96 |
| 5,048,077 A | 9/1991 | Wells et al. | 379/96 |
| 5,325,386 A * | 6/1994 | Jewell et al. | 359/214 |
| 5,334,991 A | 8/1994 | Wells et al. | 345/8 |
| 5,467,104 A | 11/1995 | Furness, III et al. | 345/8 |
| 5,557,444 A | 9/1996 | Melville et al. | 359/199 |
| 5,657,165 A | 8/1997 | Karpman et al. | 359/634 |
| 5,742,421 A | 4/1998 | Wells et al. | 359/214 |
| 6,151,167 A | 11/2000 | Melville | 359/618 |
| 6,160,527 A * | 12/2000 | Morishima et al. | 345/32 |
| 6,173,895 B1 | 1/2001 | Plesko | 235/462.33 |
| 6,204,832 B1 | 3/2001 | Melville et al. | 345/55 |
| 6,384,406 B1 | 5/2002 | Wine et al. | 250/234 |
| 6,755,536 B2 | 6/2004 | Tegreene et al. | 353/94 |
| 2002/0030636 A1 | 3/2002 | Richards | 359/630 |
| 2003/0086172 A1 | 5/2003 | Urey | 359/566 |

(Continued)

Primary Examiner—Euncha P. Cherry
(74) Attorney, Agent, or Firm—Dorsey & Whitney LLP

(57) ABSTRACT

A scanned light display system includes a light emitter array having a plurality of light sources operable to emit diverging light and an array of collimating elements positioned so that each of the collimating elements receive at least a portion of the light emitted from a corresponding one of the light sources. Each of collimating elements is configured to substantially collimate the received light from at least one corresponding light source into respective beams. The scanned beam display is operable to scan the respective beams to provide an image to a viewer. The displayed image appears substantially fixed to a viewer as the viewer's eye moves relative to the array of collimating elements. In one embodiment, each of the collimating elements is a curved mirror. In other embodiments, each of the collimating elements includes at least one lens or a curved mirror/lens pair.

74 Claims, 11 Drawing Sheets

U.S. PATENT DOCUMENTS

2005/0264502 A1  12/2005  Sprague et al. ............... 345/32
2006/0061846 A1  3/2006   Sprague et al. ............. 359/204
2006/0181484 A1  8/2006   Sprague et al. ............... 345/32

* cited by examiner

SCANNED LIGHT DISPLAY SYSTEM USING ARRAY OF COLLIMATING ELEMENTS IN CONJUNCTION WITH LARGE NUMERICAL APERTURE LIGHT EMITTER ARRAY

CROSS-REFERENCE TO RELATED APPLICATIONS

This application is a continuation of pending U.S. patent application Ser. No. 11/200,484, filed Aug. 8, 2005, which claims the benefit of U.S. Provisional Patent Application No. 60/610,911, filed Sep. 17, 2004, the disclosure of which is incorporated herein by reference.

This application relates to U.S. patent application Ser. No. 11/078,970, entitled SCANNED LIGHT DISPLAY SYSTEM USING LARGE NUMERICAL APERTURE LIGHT SOURCE, METHOD OF USING SAME, AND METHOD MAKING SCANNING MIRROR ASSEMBLIES, filed on Mar. 9, 2005, the disclosure of which is incorporated herein by reference.

TECHNICAL FIELD

This invention relates to scanned light display systems, and more particularly to scanned light displays having a light emitter array used in conjunction with an array of collimating elements.

BACKGROUND

A variety of techniques are available for providing visual displays of still or video images to a user. One form of display is a scanned beam display. In one example of a scanned beam display, a scanning light source outputs a beam of coherent light that is reflected by a mirror in a MEMS scanner onto a viewer's retina. The scanned light enters the viewer's eye through the viewer's pupil and is directed onto the retina by the cornea and lens. The intensity of the light from the light source is modulated as the beam is scanned horizontally and vertically so that the viewer perceives an image. In other examples, the scanning source may include one or more modulated light emitters that are rotated through an angular sweep to scan the light onto the viewer's retina.

A typical requirement of scanned beam displays has been the need to collimate the light into a beam having a relatively small numerical aperture, i.e., a small divergence angle, prior to scanning the beam across the field-of-view. Unfortunately, providing a collimated, low numerical aperture beam of light frequently employs relatively expensive coherent light sources such as lasers, or edge-emitting light emitting diodes ("EELED"). Such collimated light sources may result in low optical efficiency and have the effect of producing a dimly lit display. Additionally, conventional scanned beam displays may require a relatively complex set of optics to deliver a scanned beam image.

SUMMARY

Apparatuses and methods for scanned light display systems are disclosed. According to one aspect, a scanned light display system includes a light emitter array having a plurality of light sources operable to emit diverging light and an array of collimating elements. Each of the collimating elements corresponds to one or more of the light sources and is positioned to receive at least a portion of the diverging light from the corresponding one or more of the light sources. Each of the collimating elements is configured to substantially collimate the received diverging light into respective beams. The scanned light display system further includes an actuator system coupled to at least one of the light emitter array and the array of collimating elements, the actuator system being operable to move at least one of the light emitter array and the collimating elements to scan the respective beams to provide an image to a viewer.

The scanned beam display systems described herein enable the image displayed to the viewer to appear substantially fixed as the viewer's eye moves relative to the array of collimating elements.

DETAILED DESCRIPTION OF THE EMBODIMENTS

Figure 1A:
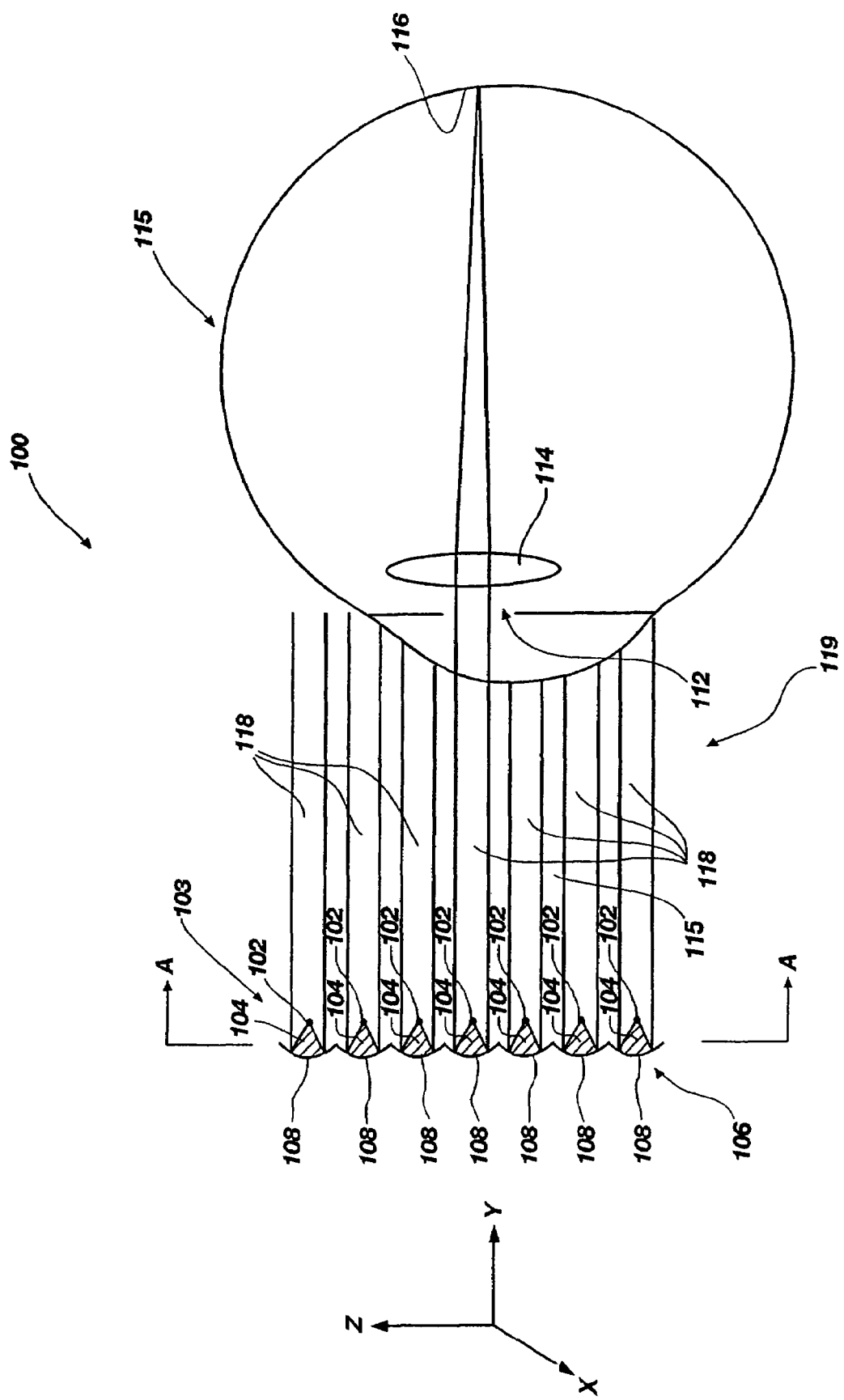
FIG. 1A is a schematic cross-sectional view of a scanned beam display having a mirror array with each curved mirror of the mirror array having at least one corresponding light emitter according to one embodiment.
Figure 1B:
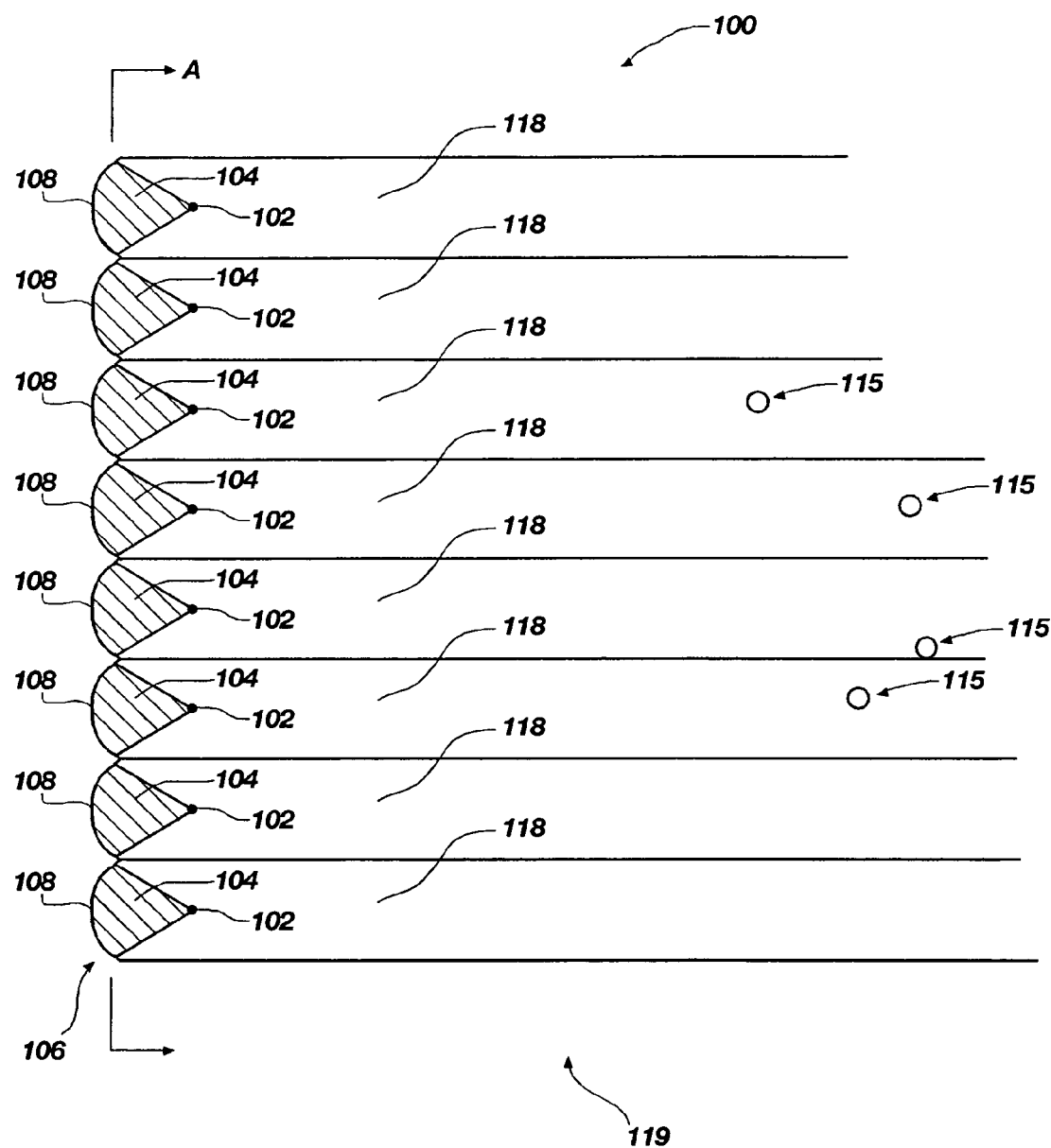
FIG. 1B is a schematic cross-sectional view of a scanned beam display having a mirror array with each curved mirror of the mirror array having at least one corresponding light emitter according to an embodiment having a different scale than the embodiment of FIG. 1A.
Figure 2:
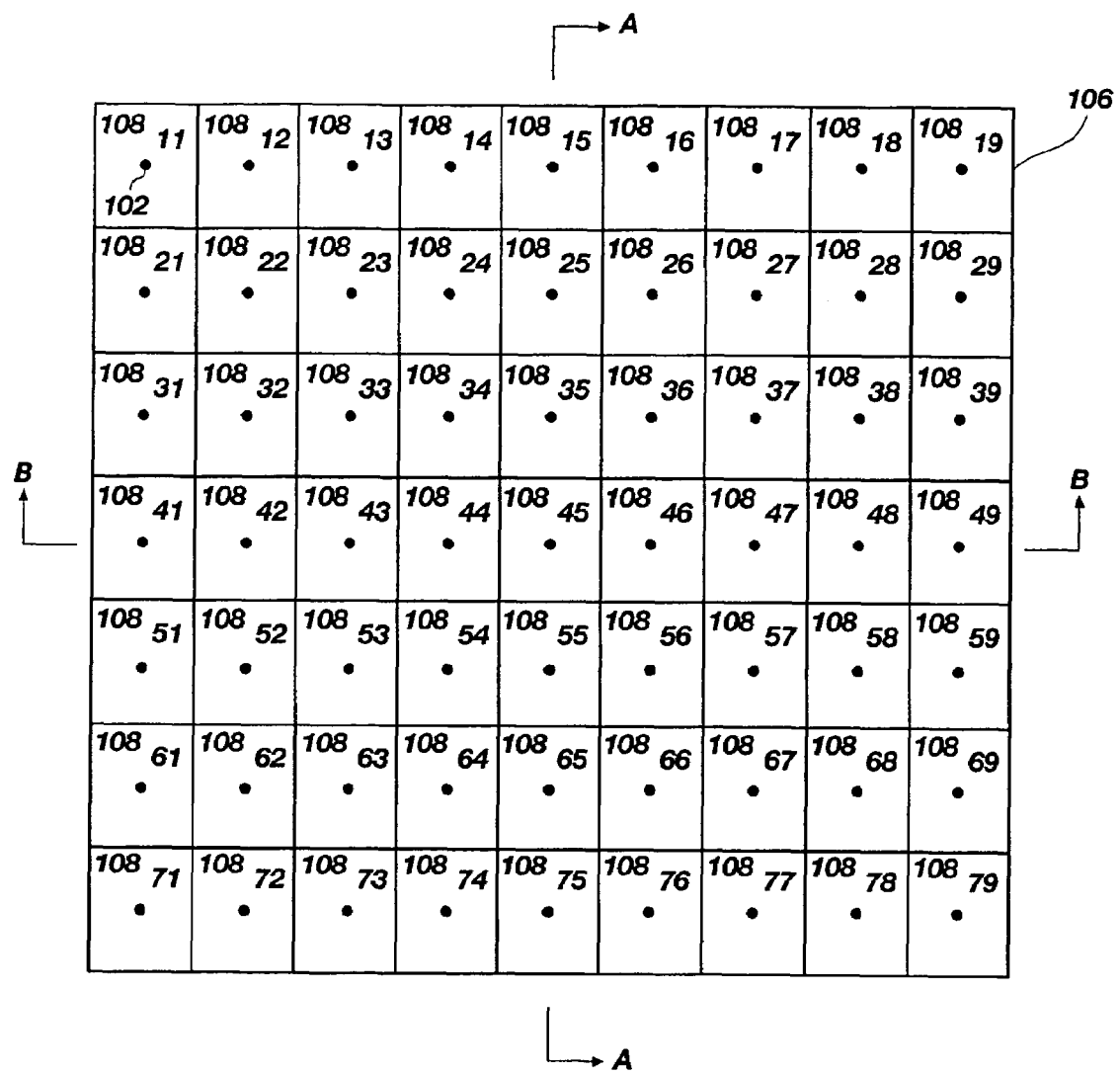
FIG. 2 is a schematic plan view of the mirror array and light emitter array of FIGS. 1A and 1B.

Apparatuses and methods directed to scanned beam displays that employ an array of collimating elements to substantially collimate light emitted by a light emitter array are disclosed. As will be apparent from the description of the various embodiments below, the collimating elements may be curved mirrors, lenses, or lens/curved mirror pairs. FIGS. 1A, 1B, and 2 show a scanned beam display 100 according to one embodiment. The display 100 includes a mirror array 106 positioned in front of a pupil 112 of a viewer's eye 115. Whereas the system of FIG. 1A illustrates a personal display system aligned with a single viewer's eye 115, FIG. 1B illustrates a larger scale display system that may be simultaneously viewed by several viewers. In each case, the mirror array 106 includes a plurality of curved mirrors 108 with each of the curved mirrors 108 configured, for example, as a spherical mirror. The display 100 further includes a light emitter array 103 having a plurality of light emitters 102. In the embodiments shown in FIGS. 1A, 1B, and 2, each light emitter 102 is positioned in front of a corresponding curved mirror 108, and located on or proximate the focal surface of a corresponding curved mirror 108. Each of the light emitters 102 is operable to emit diverging light 104 (i.e., light having a relatively large numerical aperture). In some contexts, the light emitters 102 may also be referred to as Lambertian light sources, though not all large numerical aperture devices are Lambertian.

The individual light emitters 102 of the array 103 may be a light source, such as a surface-emitting LED light source, an organic LED (OLED) light source, an edge emitting light emitting diode, a laser diode, a diode-pumped solid state (dpss) laser, a photoluminescent spot, a reflector, a fiber-optic source, or another suitable light source. In some embodiments, each of the light emitters 102 may include a plurality of light emitters such as, for example, an RGB triad or an RGBG quadrad. The relative intensity of the RGB or RGBG emitters may be controlled to replicate the color of a correspondingly positioned location in the image being displayed. If the light emitter 102 emits light in all directions, the eye side of the light emitters 102 should be masked so that any light 104 emitted therefrom is only directed toward a corresponding curved mirror 108 and masked from being directed onto the viewer's eye 115.

The aforementioned light sources emit light in a cone or Lambertian pattern that fills a corresponding curved mirror 108 substantially uniformly. Uniformly filling the curved mirrors 108 improves image uniformity because different portions of the beam reflected by the curved mirrors 108 may enter the pupil 112 from different angles during a horizontal and vertical sweep of respective beams 118. Although the efficiency of the light emitters 102 may be less than optimum because a portion of the light 104 may miss a corresponding curved mirror 108, the numerical aperture of the individual light emitters 102 may be substantially matched to the collection numerical aperture of a corresponding curved mirror 108 to provide greater efficiency, while meeting other design constraints.

FIG. 2 shows a plan view of the mirror array 106 and the light emitter array 103. In FIG. 2, only some of the individual light emitters 102 are provided with reference numerals for clarity. The mirror array 106 and the light emitter array 103 is depicted in FIG. 2 as a two-dimensional rectangular array with each of the curved mirrors 108 configured so that the peripheral edges thereof abut an adjacent one of the curved mirrors 108. However, depending upon the quality of the image desired, the curved mirrors 108 may be slightly spaced apart so that they do not abut each other. The configuration for the mirror array 106 and the light emitter array 103, and the precise number of curved mirrors 108 and light emitters 102 may vary depending upon the particular application. In one embodiment, the mirror array 106 and the light emitter array 103 has a hexagonal configuration or another suitable configuration. In an alternative embodiment, the mirror array 106 is a one-dimensional mirror array. The display 100 may be configured as a see-through display in which a background image positioned behind the mirror array 106 is visible, for example if the curved mirrors 108 of the mirror array 106 are semi-transparent, or if beams from the mirror array 106 are reflected to the user though a semi-transparent reflective surface.

The curved mirrors 108 of the mirror array 106 may have a relatively small radius of curvature. Thus, the focal surface of each of the curved mirrors 108 is located a shorter distance from a respective curved mirror 108, and each of the light emitters 104 are positioned relatively closer to a corresponding curved mirror 108, than if a corresponding single large curved mirror was employed. This may be used, for example, to form a relatively thin and light weight mirror array 106/light emitter array 103 structure. Employing a relatively thin and light weight mirror array 106/light emitter array 103 structure facilitates using such a structure in place of a conventional lens in a pair of eyeglasses or another suitable head worn apparatus.

The curved mirrors 108 of the mirror array 106 provide two functions. First, the curved mirrors 108 substantially collimates the light 104 emitted from corresponding light emitters 102 into respective beams 118. Each of the beams 118 are generally parallel to each other, and collectively define a composite beam 119. Depending upon the size and pitch of the curved mirrors 108, the beams 118 may be larger or smaller than the diameter of the viewer's pupil 112. The mirror array 106 may be configured so that the lateral spacing between adjacent beams 118 is smaller than the diameter of the viewer's pupil 112. In some embodiments, each of the beams 118 abuts an adjacent beam 118 so that the lateral spacing between adjacent beams 118 is insubstantial or nonexistent. When the diameter of the viewer's pupil 112 is smaller than the diameter of a beam 118, relatively fewer beams 118 enter the viewer's eye 115 at any one time compared to the case where diameter of the viewer's pupil 112 is larger than the diameter of the beam 118, and only a portion of the beam 118 enters the viewer's pupil 112.

Figure 3:
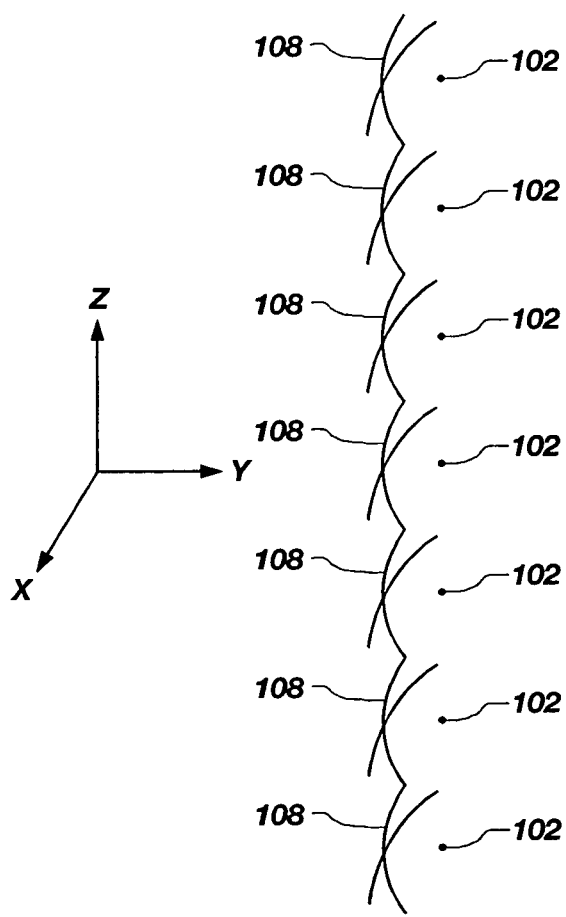
FIG. 3 is a schematic cross-sectional view of the mirror array and the light emitter array of FIGS. 1A-B and 2 with the curved mirrors of the mirror array operable to be rotated to scan the light received from the light emitters.

The composite beam 119 is scanned across a viewer's pupil 112, using scanning techniques that will be discussed in more detail below in FIGS. 3 and 4, with the beams 118 that enter the viewer's pupil 112 being focused by the viewer's lens 114 onto the retina 116. The degree of collimation provided by a respective curved mirror 108 generally corresponds to an apparent image distance. Generally, the plurality of curved mirrors 108 provides the full field-of-view to the viewer. One of the curved mirrors 108 contributes a first portion of the field-of-view and at least a second curved mirror 108 contributes a second portion of the field-of-view. Depending upon the position and movement of the viewer's pupil 112 relative to the light emitter array 103, different curved mirrors 108 may provide a particular pixel during a particular video frame.

In operation, the composite beam 119 is scanned across the viewer's pupil 112 to display an image to the viewer. Each pixel of the displayed image is associated with a particular angle of incidence of the beam 118 relative to the viewer's pupil 112. Each of the pixels is formed by scanning the composite beam 119 so that at least one of the beams 118 having the angle of incidence with the viewer's pupil 112 associated with a particular pixel is received by the viewer's pupil 112. Thus, the beam 118 of one of the curved mirrors 108 may provide a particular pixel and the beam 118 of at least another one of the curved mirrors 108 may provide another pixel. The particular pixel provided by the beam 118 of a respective curved mirror 108 depends upon whether the beam 118 is received by the viewer's pupil 112. For example, as shown in FIG. 1, each of the beams 118 of the composite beam 119 will generate the same pixel when received by the viewer's pupil 112 because the angle of incidence between each of the beams 118 and the viewer's pupil 112 is the same for each of the beams 118. Thus, if the mirror array 106 is displaced vertically relative to the viewer's pupil 112 due to vibration or the viewer's eye 115 moving, at least one of the beams 118 will be received by the viewer's pupil 112 to form the pixel. In other words, it does not matter which particular beam 118 the viewer's pupil 112 receives so long as one of the beams 118 having the angle of incidence with the viewer's pupil 112 is received thereby. Accordingly, the displayed image appears substantially fixed to the viewer regardless of any relative movement between the mirror array 106 and the viewer's eye 115. Furthermore, there may be cases where a portion of a displayed image will not be perceived by the viewer because the relative orientation of the mirror array 106 and the viewer's pupil 112 will not enable the requisite beams 118 that form the missing portion to be received by the viewer's pupil 112.

Different portions of the mirror array 106 provides different portions of the displayed image. Again referring to FIG. 2, for example, if the viewer's pupil 112 is centered approximately on the curved mirror $108_{45}$, the pixels for the lower portion of the displayed image are provided by the curved mirrors 108 located below the line B-B and the pixels for the upper portion of the displayed image perceived by the viewer is provided by the curved mirrors 108 located above the line B-B. Similarly, the pixels for the left portion of the displayed image perceived by the viewer is provided by the curved mirrors 108 located to the left of the line A-A and the pixels for the right portion of the displayed image are provided by the curved mirrors 108 located to the right of the line A-A. If the mirror array 106 is displaced or the viewer's eye 115 moves relative to the mirror array 106, then each of the curved mirrors 108 contributes a different portion of the displayed image than the previous example where the viewer's pupil was centered on the curved mirror $108_{45}$. For example, if the mirror array 106 is displaced upwardly so that the viewer's pupil 212 is centered on the curved mirror $108_{75}$, there are no longer any curved mirrors 108 located at a position corresponding to the bottom portion of the displayed image. Therefore, the bottom portion of the displayed image will no longer be visible to the viewer and the upper portion of the displayed image will be provided by mirrors approximately below line B-B. Regardless of which particular curved mirrors 108 the pixels are provided from, the displayed image appears substantially fixed to the viewer with any relative displacement between the mirror array 106 and the viewer's eye 115.

Stated another way, the beams 118 from each of the curved mirrors 108 may be scanned to generate corresponding identical images. However, the viewer's pupil 112 does not receive the entire image from each of the curved mirrors 108. Instead, only a portion of the images from some or all of the respective curved mirrors 108 are received by the viewer's pupil 112. Furthermore, although each of the curved mirror 108/light emitter 102 pairs generate identical images, some of the curved mirror 108/light emitter 102 pairs may not contribute to the displayed image perceived by the viewer if the location of a particular curved mirror 108/light emitter 102 pair relative to the viewer's pupil 112 is outside the range that the particular curved mirror/light emitter 102 pair can scan the beams 118 to be received by the viewer's pupil 112.

Various techniques for scanning the composite beam 119 may be used. In one embodiment shown in FIG. 3, the composite beam 119 is scanned by individually scanning each of the beams 118 reflected from corresponding curved mirrors 108. The beams 118 reflected from corresponding curved mirrors 108 are scanned in the vertical z-axis direction by tilting, i.e., rotating each of the curved mirrors 108 about the x-axis using an actuator that may be one of a set of horizontal and vertical actuators (not shown) coupled respectively to each of the curved mirrors 108. In an alternative embodiment, the beams 118 reflected from corresponding curved mirrors 108 may be scanned in the vertical z-axis direction by vertically moving each of the curved mirrors 108 in the z-axis direction without rotation thereof using an actuator that may be one of a set of horizontal and vertical actuators (not shown) coupled respectively to each of the curved mirrors 108. Rotating and/or vertically moving respective curved mirrors 108 will scan corresponding beams 118 in the vertical z-axis across direction the viewer's pupil 112.

Figure 4:
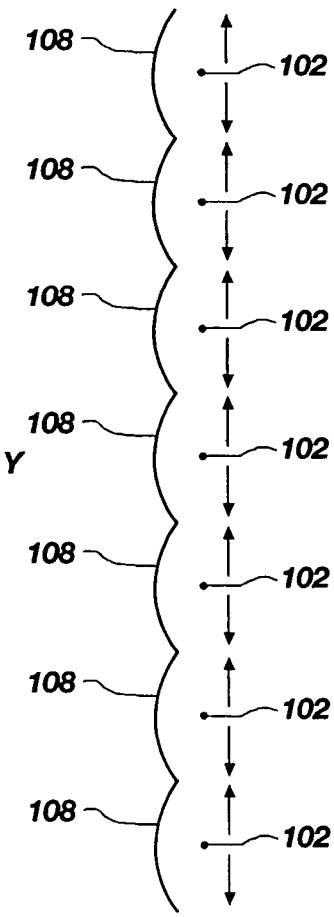
FIG. 4 is a schematic cross-sectional view of the mirror array and the light emitter array of FIGS. 1A-B and 2 with the curved mirrors of the mirror array operable to be moved vertically to scan the light received from the light emitters.

FIG. 4 shows an alternative embodiment for scanning the composite beam 119 by individually scanning each of the beams 118. The beams 118 are scanned by vertically moving each of the light emitters 102 in the z-axis direction, while a corresponding curved mirror 108 is maintained substantially stationary. In one embodiment, each of the light emitters 102 move in a curved path in order to remain on or proximate the focal surface of a corresponding curved mirror 108 using an actuator that may be one of a set of horizontal and vertical actuators (not shown) coupled respectively to each of the light emitters 102. In yet another alternative embodiment, the mirror array 106/light emitter array 103 structure is tilted, i.e., rotated about the x-axis as a unit to scan the beams 118 in the vertical z-axis direction using a single actuator (not shown) that is coupled to all of the light emitters 102 and curved mirrors 108. In yet another alternative embodiment, combinations of any of the aforementioned embodiments for scanning the beams 118 are used. Similarly, according to various embodiments, the beams 118 may be scanned in the horizontal x-axis direction by tilting, i.e., rotating each of the curved mirrors 108 about the z-axis, horizontally moving each of the curved mirrors 108 in the x-axis direction without rotation thereof, horizontally moving each of the light emitters 102 in the x-axis direction along a path that may maintain the light emitters 102 on or proximate the focal surface of a corresponding curved mirror 108 while the curved mirrors 108 are maintained substantially stationary, tilting the mirror array 106 and the light emitter array 103 as a unit about the z-axis direction, or combinations thereof. Accordingly, the image generated by each of the curved mirror 108/light emitter 102 pairs and, consequently, the displayed image to the viewer, may be formed by the combination of horizontal and vertical scanning in conjunction with modulation of the light emitters 102.

The individual curved mirrors 108 and light emitters 102 may be scanned at various rates. According to various embodiments, the curved mirrors 108 and light emitters 102 are individually scanned or scanned as a unit, if applicable, at a frame rate of, 60 Hz for example, and each light emitter 102 in the array 103 is modulated at a frequency of 36 KHz to provide a display having the quality of an SVGA display. In one embodiment, the beams 118 of the curved mirror 108/light emitter 102 pairs are scanned synchronously. In an alternative embodiment, the beams 118 of the curved mirror 108/light emitter 102 pairs are scanned asynchronously. During asynchronous scanning of the beams 118, the light emitters 102 of each of the curved mirror 108/light emitter 102 pairs emits light 104 at the same intensity for a given angle of incidence between the beam 118 and the viewer's pupil 112, although not at the same time. In either embodiment, if the curved mirrors 108 are rotated or translated horizontally and/or vertically, the curved mirrors 108 are moved in a manner to prevent physical interference between adjacent curved mirrors 108.

In some embodiments, it may be desirable that the some of the curved mirrors 108 only provide selected pixels of the image displayed to the viewer in order to reduce power consumption. For example, with reference to FIG. 2, the light emitters 102 of the upper row of curved mirrors $108_{11}$-$108_{19}$ may not be activated to provide pixels for the lower portion of the image displayed to the viewer.

Figure 5:
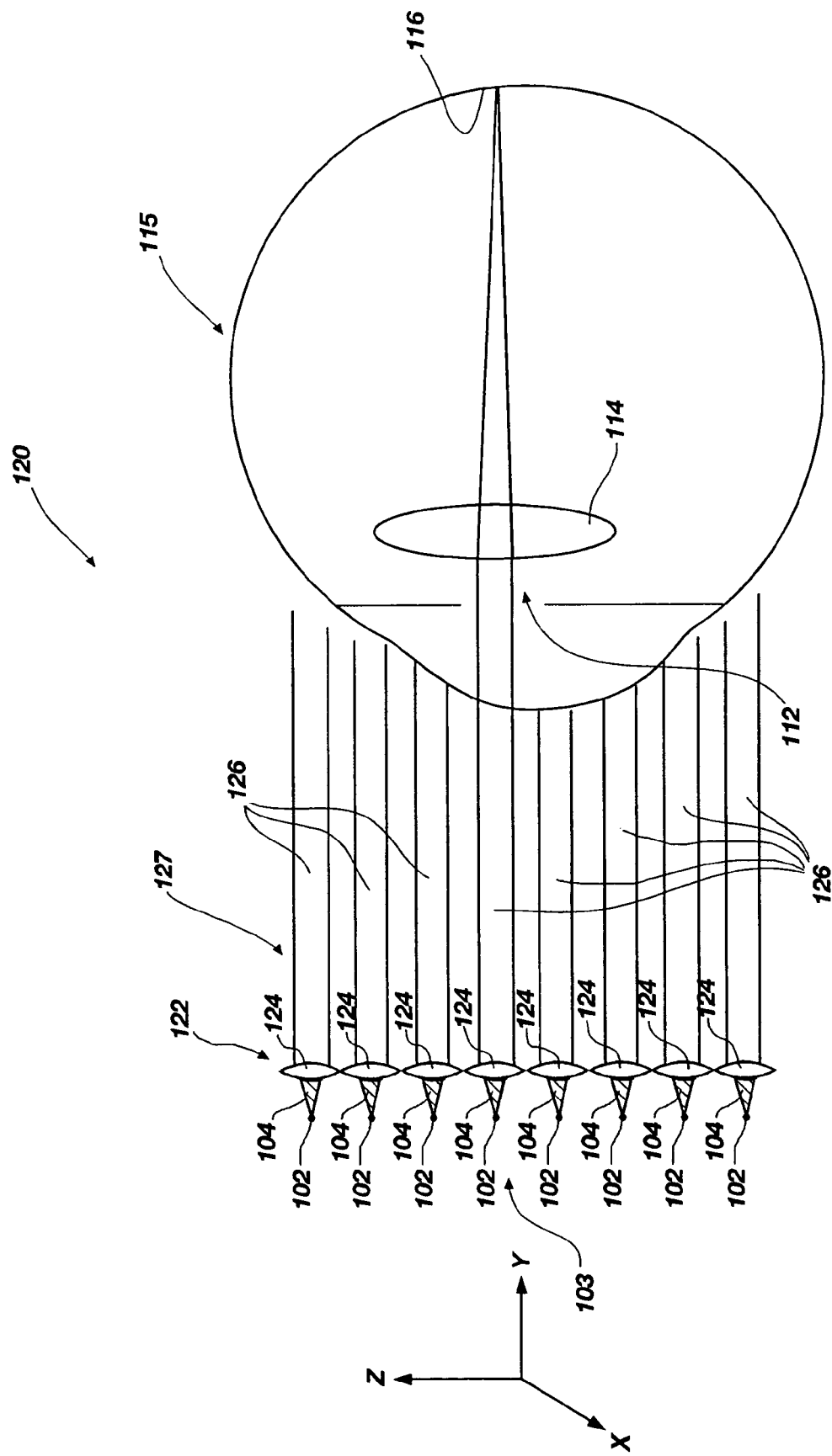
FIG. 5 is a schematic cross-sectional view of a scanned beam display having a lens array with each lens of the lens array having at least one corresponding light emitter according to one embodiment.

FIG. 5 shows a scanned beam display 120 that employs a lens array instead of a mirror array to collimate the light emitted from the light emitter array according to an embodiment that is structurally similar to the display 100 of FIG. 1. Therefore, in the interest of brevity, components in both displays 100, 120 that are identical to each other have been provided with the same reference numerals, and an explanation of their structure and function will not be repeated unless the components function differently in the two displays 100, 120. The display 120 includes a lens array 122 positioned in front of the viewer's eye 112. The lens array 122 includes a plurality of lenses 124. The display 120 further includes a light emitter array 103 having a plurality of light emitters 102. Each of the lenses 124 has a corresponding light emitter 102. In one embodiment, each of the lenses 124 may be a doublet. In other embodiments, each of the lenses 124 may be a converging lens or another suitable type of lens that is configured to substantially collimate light emitted from the light emitters 102. The lens array 122 and the light emitter array 103 may have any of the aforementioned geometric configurations as the mirror array 106 and the light emitter array 103 of the display 100 shown in FIG. 1, such as a 1-D, 2-D, hexagonal, rectangular array of lenses 122 and light emitters 102, etc.

In operation, each of the light emitters 102 emits diverging light 104 having a relatively large numerical aperture. Each of the lenses 124 receives corresponding light 104, and collimates the light 104 into respective beams 126 to form a composite beam 127 defined by each of the beams 126 that are generally parallel to each other. As with the display 100, each of the beams 126 may abut each other or may be laterally spaced apart a distance smaller than the diameter of the viewer's pupil 112. Similar to the display 100 of FIG. 1, each of the lenses 124/light emitter 102 pairs is operable to scan the composite beam 127 across the viewer's pupil 112. The scanning of the composite beam 127 is performed in a manner identical to the display 100 of FIG. 1 except instead of the curved mirrors 108 being translated or rotated, the lenses 124 may be translated or rotated. In the interest of brevity such scanning techniques will not be discussed thoroughly.

One suitable actuator system for moving the respective lenses 124 of the lens array 122 relative to the corresponding light emitters 102 is disclosed in U.S. Pat. No. 6,104,832 to Melville et al., the disclosure of which is incorporated herein by reference. The actuator systems disclosed in the '832 Patent may also be adapted to move the curved mirrors 108, the light emitters 102 of the display 100 (FIG. 1) and the display 128 (FIG. 6), and/or the light source/mirror or light source/lens assembly. Various actuator systems such as electrostatic, electrocapacitive, electromagnetic, bimetallic, galvanometric, piezoelectric, combinations thereof, and others may be used to scan some or all of the components described herein.

Figure 6:
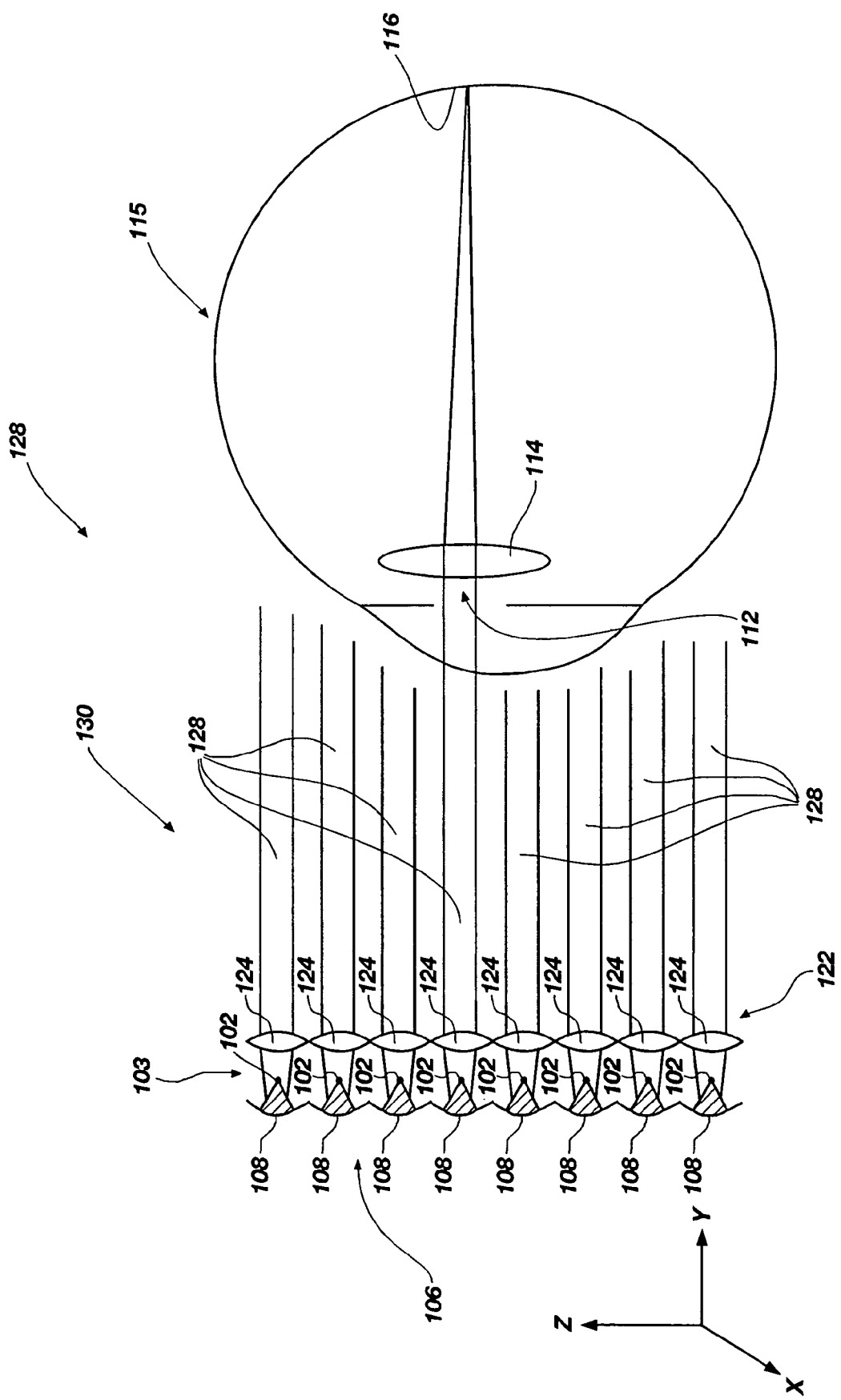
FIG. 6 is a schematic cross-sectional view of a scanned beam display having a mirror array and a lens array with a light emitter array positioned therebetween according to one embodiment.

FIG. 6 shows a scanned beam display 128 that is structurally similar to the scanned beam displays 100 and 120 of FIGS. 1 and 5. Therefore, in the interest of brevity, components in both displays 100, 120, 128 that are identical to each other have been provided with the same reference numerals, and an explanation of their structure and function will not be repeated unless the components function differently in the two displays 100, 120, 128. The display 128 includes a mirror array 106 positioned in front of the viewer's pupil 112. A lens array 122 having a plurality of lenses 124 is located between the light emitter array 103 and the viewer's pupil 112. Each of the light emitters 102 is located forward or aft of the focal surface of a corresponding curved mirror 108.

In operation, each of the light emitters 102 emit diverging light 104 that is reflected from a corresponding curved mirror 108. However, since the light emitters 102 are located forward or aft of the focal surface of a corresponding curved mirror 108, the light reflected from a corresponding curved mirror 108 will not be collimated (e.g., slightly divergent). Each of the lenses 124 substantially collimates the light reflected from a corresponding curved mirror 108 into respective beams 128 that define a composite beam 130. As with the display 100 of FIG. 1 and the display 120 of FIG. 2, the composite beam 130 is scanned across the viewer's pupil 112 to form the displayed image.

Various techniques for scanning the composite beam 130 across the viewer's pupil 112 may be used. In one embodiment, the composite beam 130 is scanned by individually scanning each of the beams 128. In one embodiment, each of the light emitters 102 are moved vertically in the z-axis direction, while the lens array 122 and the mirror array 106 are maintained substantially stationary in order to vertically scan light in the z-axis direction collimated by each of the lenses 124 using an actuator that may be one of a set of horizontal and vertical actuators (not shown) coupled respectively to each of the light emitters 102. In an alternative embodiment, each of the light emitters 102 may be rotated about an axis that extends through or proximate a corresponding lens 124 in the x-axis direction. In this embodiment, each of the light emitters 102 rotates so that it is located on or proximate the focal surface of the optical system defined by a curved mirror 108/lens 124 pair. In an alternative embodiment, each of the curved mirrors 108 and corresponding light emitters 102 are maintained substantially stationary and each of the lenses 124 may be tilted, i.e., rotated about the x-axis, moved vertically in the z-axis direction, or combinations thereof to scan the beam across the viewer's pupil 112 in the vertical z-axis direction using an actuator that may be one of a set of horizontal and vertical actuators (not shown) coupled respectively to each of the lenses 124. In yet another alternative embodiment, each of the lenses 124 and corresponding light emitters 102 are maintained substantially stationary, while the light collimated by the lenses 124 may be scanned in the vertical z-axis direction in a manner similar to the display 100 of FIG. 1 by tilting, i.e., rotating each of the curved mirrors 108 about the x-axis, vertically moving each of the curved mirrors 108 in the z-axis direction without rotating the curved mirrors 108, or combinations thereof using an actuator that may be one of a set of horizontal and vertical actuators (not shown) coupled respectively to each of the curved mirrors 108. In one embodiment that does not individually scan each of the beams 128, the mirror array 106/lens array 122/light emitter array 103 structure is tilted as a unit about the x-axis direction.

According to various embodiments, the beams 128 may be scanned in the horizontal x-axis direction by tilting, i.e., rotating each of the lenses 124 about the z-axis, horizontally moving each of the lenses 124 in the x-axis direction without moving a corresponding curved mirror 108/light emitter 102, horizontally moving each of the light emitters 102 in the x-axis while a corresponding curved mirror 108/lens 124 is maintained substantially stationary, rotating about the z-axis or horizontally moving each of the curved mirrors 108 while corresponding lens array 122/light emitter array 103 are maintained substantially stationary, tilting the mirror array 106/lens array 122/light emitter array 103 structure as a unit about the z-axis direction, or combinations thereof. Accordingly, the identical images generated by each of the curved mirror 108/light emitter 102/lens 124 sets and, consequently, the displayed image to the viewer, may be formed by a combination of horizontal and vertical scanning in conjunction with modulation of the light emitters 102.

Figure 7:
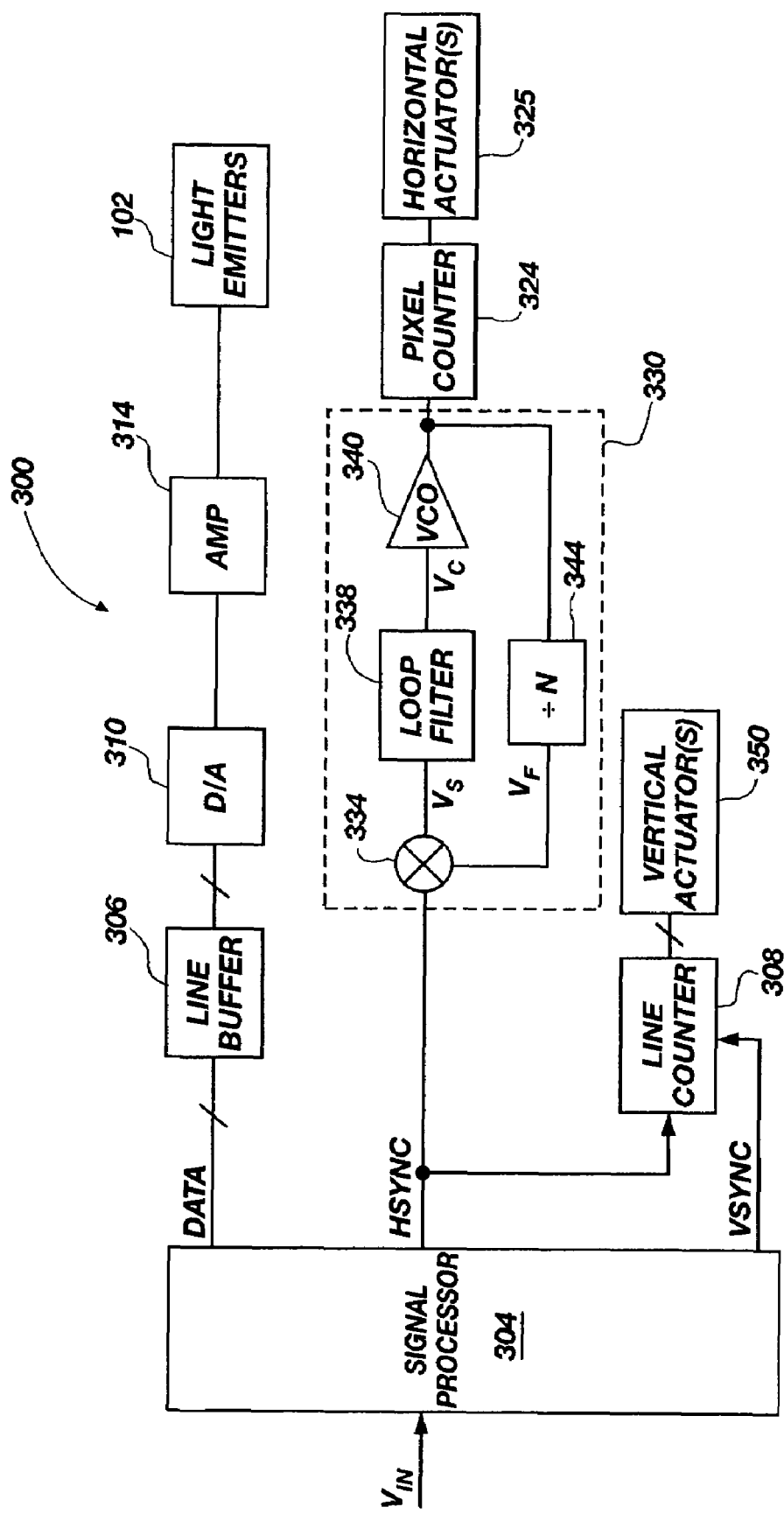
FIG. 7 is a block diagram of a control system according to one embodiment that may be used to physically scan the light emitters of the light emitter array.

One embodiment of a control system that may be used to physically scan each of the light emitters 102 of the light emitter array 103 is shown in FIG. 7. A control system 300 includes a signal processor 304 that receives a video signal $V_{IM}$ corresponding to an image. The signal processor 304 extracts digital data representing lines of the image. For example, where the video signal $V_{IM}$ is an analog signal, a conventional analog-to-digital converter may provide the digital data. Where the video signal $V_{IM}$ comprises digital data, the digital information may be extracted directly. The digital image data generated by the signal processor 304 is segmented into groups of data, where each group contains data representing a single line of the image. Each group of data corresponding to a line is stored in a line buffer 306.

The signal processor 304 also extracts horizontal and vertical synchronization signals HSYNC, VSYNC, respectively. The horizontal synchronization signal HSYNC is generated after each line of the image. After each horizontal synchronization signal HYSNC, a line of image data is retrieved from the line buffer 306 and provided to a digital-to-analog (D/A) converter 310. (The line buffer 306 operates in synchronism with a clock signal, which has been omitted from FIG. 7 in the interest of clarity). The D/A converter 310 converts the digital data to an analog signal that is amplified at an amplifier 314 and applied to each of the light emitters 102 of the light emitter array 103.

The HSYNC signal is applied to a phase lock loop 330, which includes a phase detector 334 that compares the phase of the HSYNC signal to the phase of a feedback signal $V_F$. The phase detector outputs an error signal $V_E$ having a magnitude corresponding to the difference between the phase of the feedback signal $V_F$ and the phase of the HSYNC signal. This error signal $V_E$ is amplified and low-pass filtered by a loop filter 338 to generate a control signal $V_C$ that is used to control the frequency of the signal generated by a voltage controlled oscillator ("VCO") 340. The feedback signal $V_F$ is generated by coupling the output of the VCO 340 through a frequency divider 344. The frequency divider 344 divides the frequency of the signal from the output of the VCO 340 by "N", where N is the number of pixels in each line of the image. Therefore, the VCO 340 outputs N pulses for each HSYNC pulse. Each of the N pulses increments a pixel counter 324 a digital count from the count sequentially increments. The count from the counter 324 is applied to each of the horizontal actuators 325, which move corresponding light emitters 102 horizontally from a position corresponding to a first pixel to a position corresponding to a last pixel. Thus, as the analog image signal for each line is applied to the light emitters 102, the light emitters 102 are scanned horizontally.

The HSYNC pulse occurring after each line is also applied to a line counter 308, which generates a digital value corresponding to the line of analog signals currently being applied to the light emitters 102. This digital value is applied to each of the vertical actuators 350, which move corresponding light emitters 102 vertically to a new position corresponding to the value of a digital count from the line counter 308. The light emitters 102 are scanned horizontally at this new vertical position, and the process is repeated until the entire image is generated. The line counter 308 is then reset by the vertical synchronization ("VSYNC") pulse, which occurs at the start of each image frame.

In an alternative embodiment, the control system 300 may also be adapted to physically scan the mirror array 106/light emitter array 102 structure of the display 100, the light emitter array 102/lens array 122 structure of the display 120, and the mirror array 106/light emitter array 102/lens array 122 structure of the display 128 as a unit. In such an adaptation, only a large single actuator or set of actuators is needed.

Figure 8:
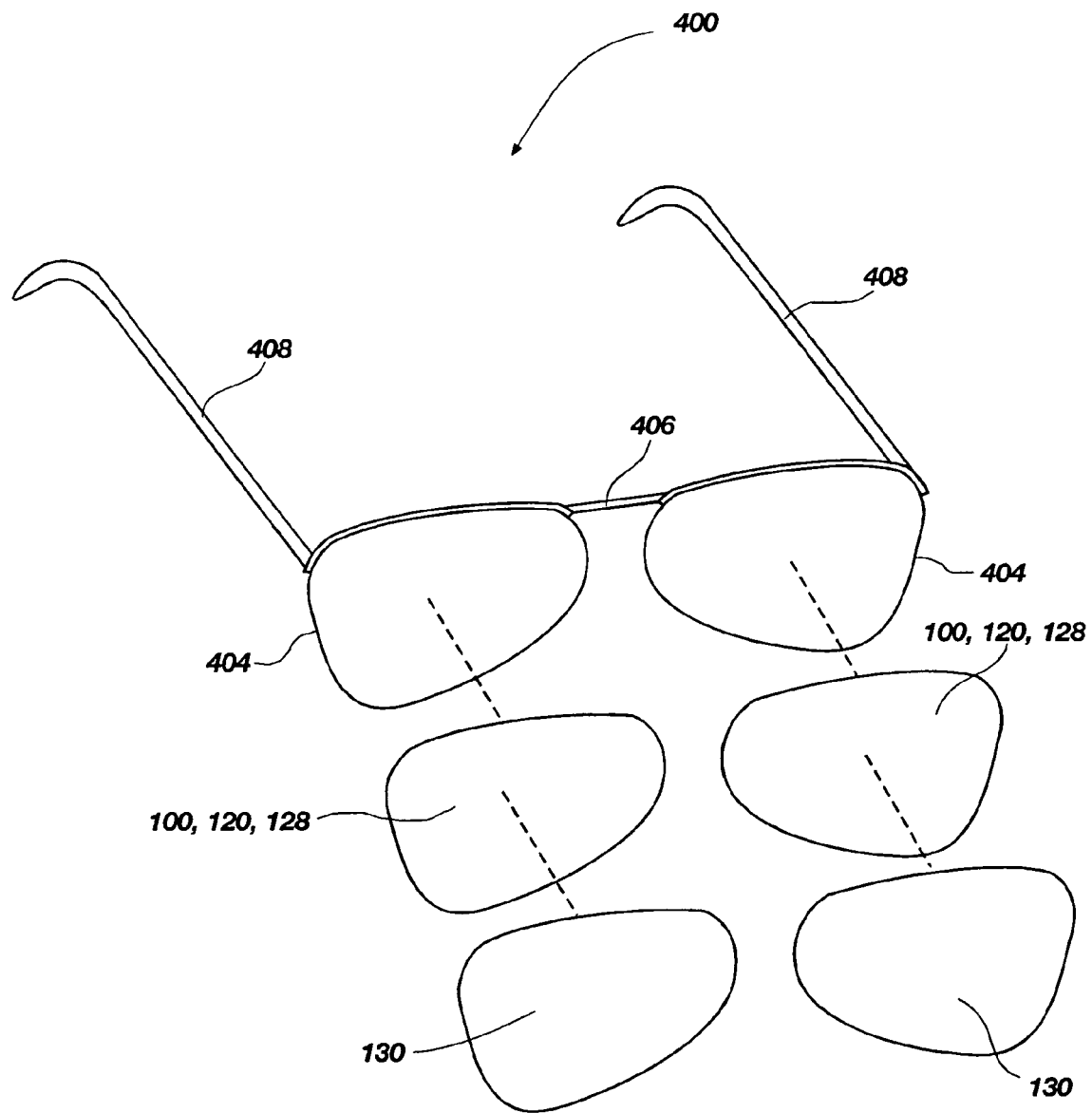
FIG. 8 is a schematic exploded isometric view of a scanned beam display in which the display is mounted in a pair of eyeglass according to an embodiment.

FIG. 8 shows a scanned beam display 400 according to an embodiment that is in the form of a see-through display physically mounted in a pair of eyeglasses. The display 400 includes a pair of generally oval holders 404, each of which supports any of the previously described display embodiments. For example, respective holders 404 may support the mirror array 106/light emitter array 102 structure of the display 100, the light emitter array 102/lens array 122 structure of the display 120, or the mirror array 106/light emitter array 102/lens array 122 structure of the display 128. The holders 404 may also support a pair of lenses 132 positioned in front of the displays 100, 120, and 128 such as, for example, corrective lenses (correcting nearsightedness or farsightedness), sunglass lenses, polarizing lenses or another suitable lens. The holders 404 are connected together using a bridge 406. Earbows 408 are attached to the outer portions of each of the holders 404 and extend away from the respective holders 404. The earbows 408 are configured so that the display 400 may be worn on a viewer's head.

Figure 9:
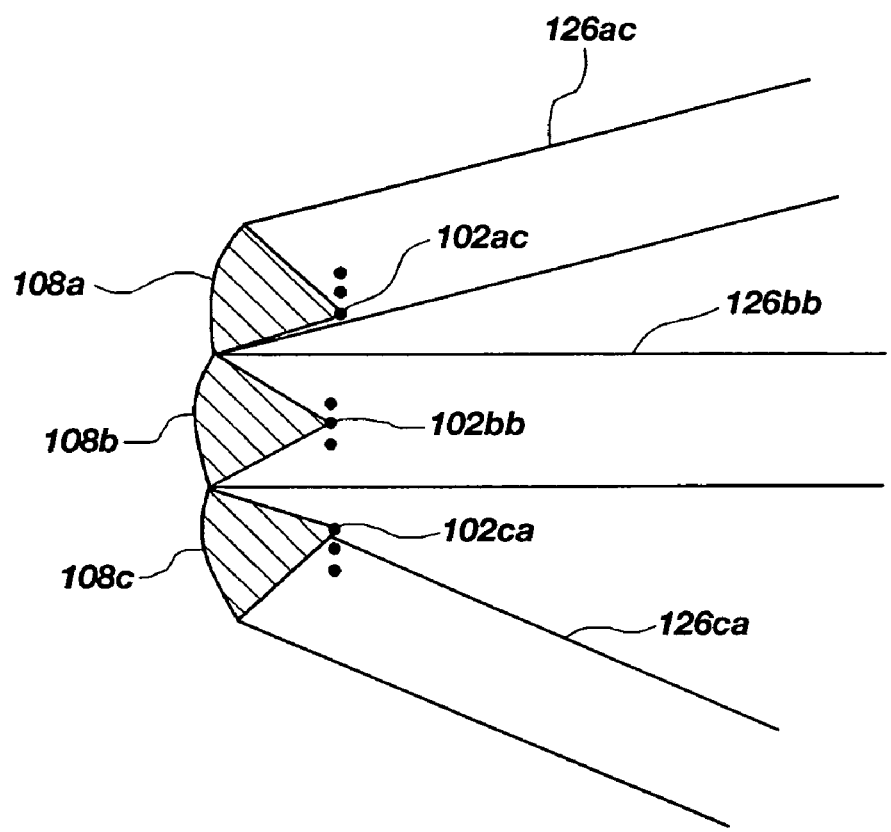
FIG. 9 is a diagram showing three sets of respective beams, each corresponding to a different one of a triad of light emitters.

In the discussion above, beams collimated by the array of mirrors and/or lenses were, for the sake of clarity, treated as if they were all substantially parallel. For cases where there are plural light emitters corresponding to each curved mirror and/or lens; and/or in cases where there is tolerance in the placement of light sources relative to the corresponding curved mirror and/or lens, beams emitted from a display 100 of FIG. 1, display 120 of FIG. 5 or a display 128 of FIG. 6 may not, in fact, be parallel. FIG. 9 is a diagram showing three sets of respective beams, each corresponding to a different one of a triad of light emitters emitted in (generally exaggerated) non-parallel directions. For the sake of clarity, only the beams from a single emitter corresponding to each mirror are shown. It will be understood that beams corresponding to beam 126ac emitted by curved mirror 108a are emitted by mirrors 108b and 108c, etc.

Figure 10:
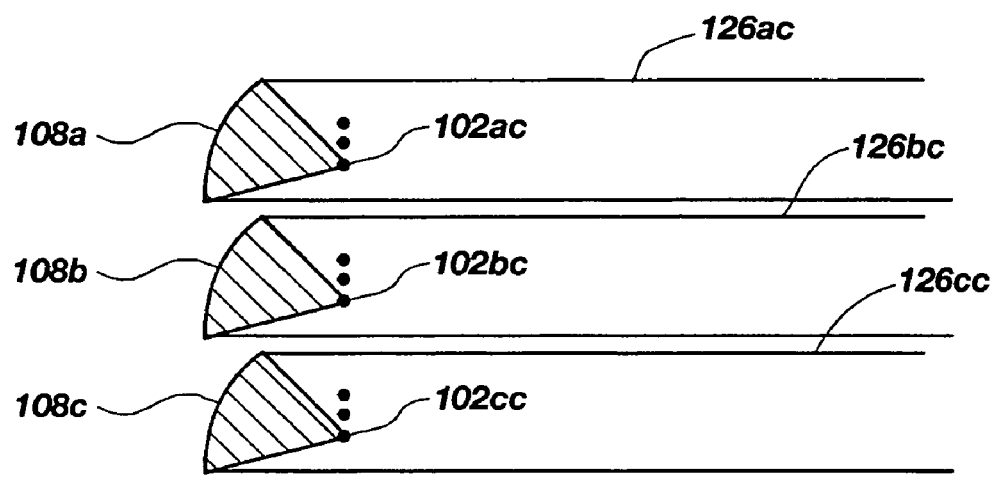
FIG. 10 is a diagram showing parallelism of beams output from corresponding emitters in a triad of light emitters.
Figure 11:
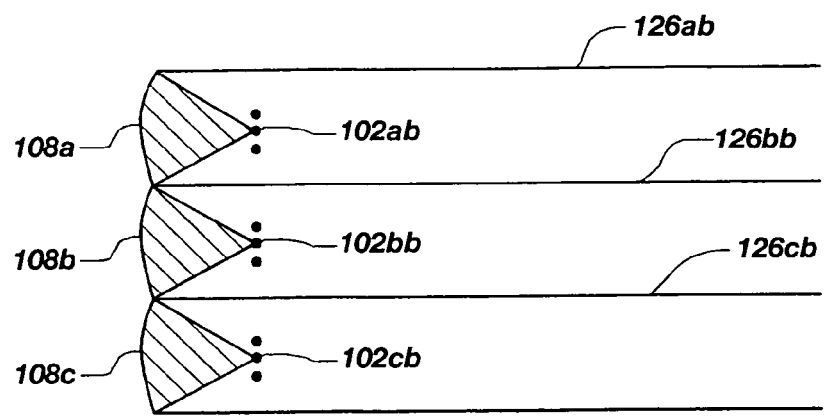
FIG. 11 is a diagram showing parallelism of beams output from different corresponding emitters in a triad of light emitters.
Figure 12:
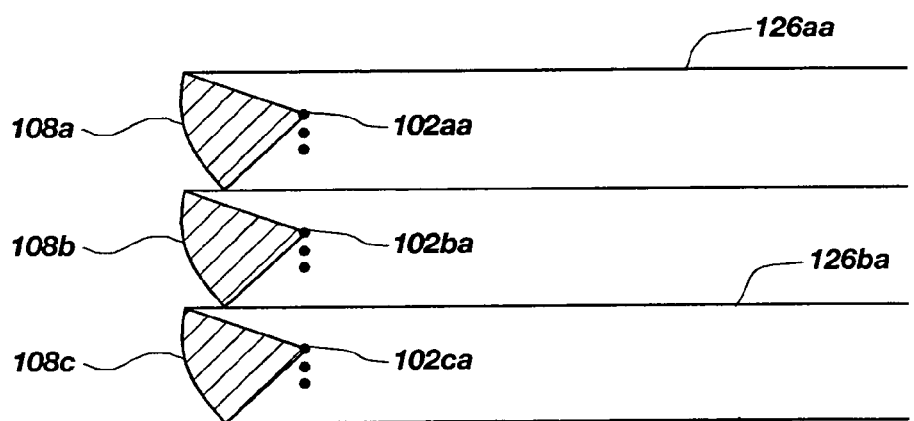
FIG. 12 is a diagram showing parallelism of beams output from a third set of corresponding emitters in a triad of light emitters.

At an instant in time, light emitted by light emitter 102ac is reflected by mirror 108a in a beam 126ac in a first direction, light emitted by light emitter 102bb is reflected by mirror 108b in a beam 126bb in a second direction, and light emitted by light emitter 102ca is reflected by mirror 108c in a beam 126ca in a third direction (assuming the mirrors are scanning synchronously). According to one embodiment, light emitter 102ac (and light emitters 102bc and 102cc, not indicated) is a blue light source, light emitter 102bb (and light emitters 102ab and 102cb, not indicated) is a green light source, and light emitter 102ca (and light emitters 102aa and 102ba, not indicated) is a red light source. Thus at an instant in time corresponding to FIG. 9 (again, assuming synchronous scanning of the mirrors 108); red light beams are emitted in a first direction parallel to beam 126ca from each of the mirrors 108a, 108b, and 108c; green light beams are emitted in a second direction parallel to beam 126bb from each of the mirrors 108a, 108b, and 108c; and blue light beams are emitted in a third direction parallel to beam 126ac from each of the mirrors 108a, 108b, and 108c. This may be appreciated more fully by reference to FIG. 10 where blue light produced by light emitters 102ac, 102bc, and 102cc is reflected by respective, synchronously scanned curved mirrors 108a, 108b, and 108c in corresponding parallel, substantially collimated blue beams 126ac, 126bc and 126cc. Similarly, FIG. 11 shows a different instant in time when green light produced by light emitters 102ab, 102bb, and 102cb is reflected by respective, synchronously scanned curved mirrors 108a, 108b, and 108c in corresponding parallel, substantially collimated green beams 126ab, 126bb and 126cb. FIG. 12 shows a different instant in time when red light produced by light emitters 102aa, 102ba, and 102ca is reflected by respective, synchronously scanned curved mirrors 108a, 108b, and 108c in corresponding parallel, substantially collimated blue beams 126aa, 126ba and 126ca.

Figure 13:
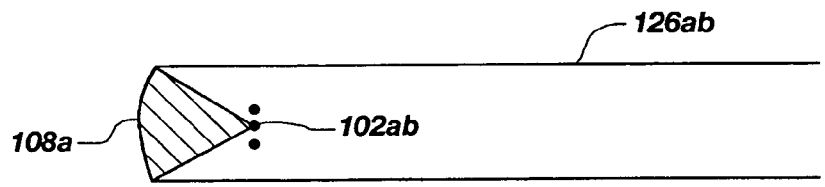
FIG. 13 is a diagram showing a mirror position at an instant in time when a first emitter in a triad of emitters is outputting light corresponding to a first pixel.
Figure 14:
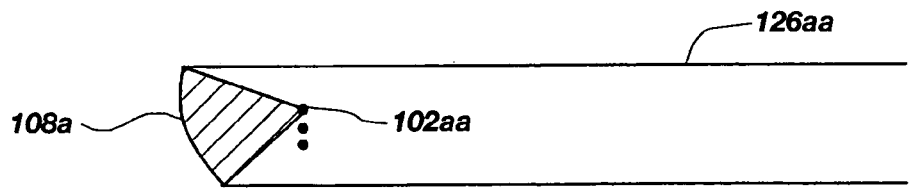
FIG. 14 is a diagram showing a mirror position at a second instant in time when a second emitter in a triad of emitters is outputting light corresponding to the first pixel.
Figure 15:
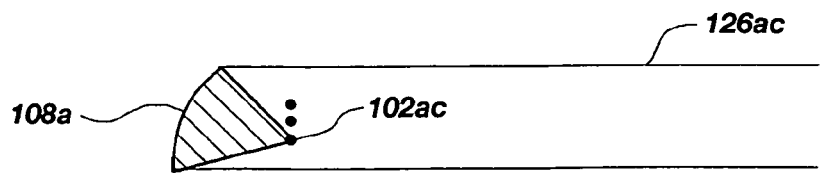
FIG. 15 is a diagram showing a mirror position at a third instant in time when a third emitter in a triad of emitters is outputting light corresponding to the first pixel.

It is noted that while the respective red, green, and blue light beams point along a similar axis at different points in time, they do so, according to some embodiments, at time intervals short enough that every pixel in the display is able to be addressed at some point during a frame cycle by each of the curved mirror/light emitter pairs. This may be appreciated more fully by reference to FIGS. 13, 14, and 14 where respectively at different instants in time corresponding to the indicated positions of mirror 108a; green, red, and blue emitters 102ab, 102aa, and 102ac are modulated to produce respective green, red, and blue signals associated with a particular pixel at a position corresponding to the particular common direction of respective beams 126ab, 126aa, and 126ac. In this way, a full color pixel may be produced at each location by varying the timing of modulating laterally displaced (non-superpositioned) light emitters 102 corresponding to each mirror 108. Similar techniques may be used for scanned emitters or scanned lenses.

Similarly, the timing of emitter modulation may be modified to compensate for misalignment of one or more of the emitter 102, mirror 108, and/or lens 124. Such timing may be determined after assembly during a calibration step and/or in the field to accommodate variation or drift in alignment. As indicated above, timing may be varied between emitter/mirror/lens pairs (triplets) to compensate for asynchronous scanning of the assemblies.

Figure 16:
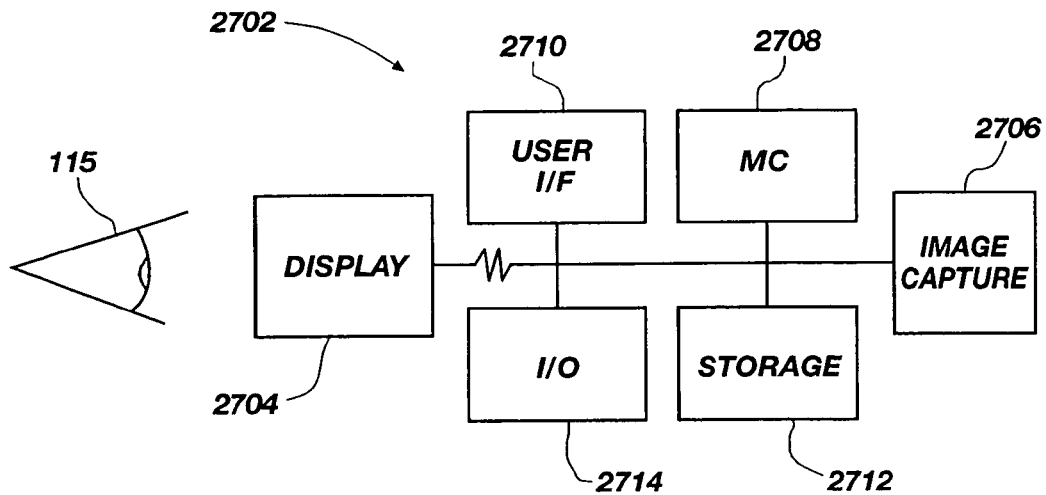
FIG. 16 is a block diagram of a scanned light display system used in conjunction with, or as a subsystem of a still or video camera or other stored image viewing system according to an embodiment.

FIG. 16 shows a block diagram of a system 2702 according to an embodiment, such as a camera, that uses a scanned beam display 2704 configured as one of the aforementioned scanned beam displays to provide images to the eye of a viewer 115. An optional digital image capture subsystem 2706 is controlled by a microcontroller 2708 to continuously or selectively capture still or video images according to user control received via user interface 2710. According to the wishes of the user, images or video may be stored in local storage 2712 and/or alternatively may be sent to an external system through input/output interface 2714. The system 2702 may be controlled to display a live image that is received by the image capture system 2706 or alternatively may be controlled to display stored images or video retrieved from the storage 2712.

Figure 17:
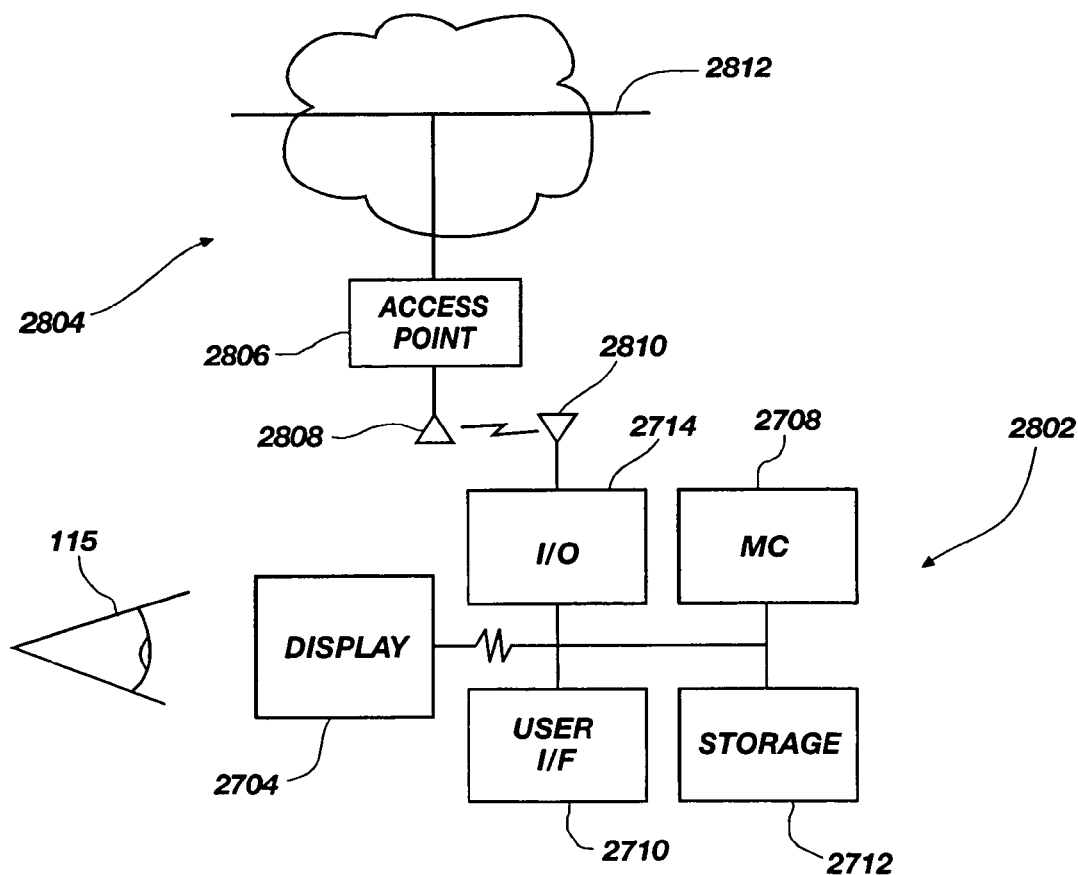
FIG. 17 is a block diagram of a media viewer capable of rendering still and/or video images to a user from a streaming and/or wireless media source according to an embodiment.

FIG. 17 shows a block diagram of a media viewing system 2802 that uses the scanned beam display 2704 to provide images to the eye of a viewer 115 according to an embodiment. The media viewing system 2802 receives images from media delivery infrastructure 2804, which may for example include video or still image delivery or generation services over the Internet, a cellular telephone network, a satellite system, terrestrial broadcast or cable television, a plug-in card, a CD or DVD, or other media sources known to the art. For example, the media delivery infrastructure 2804 may include a video gaming system for providing a video gaming image, a digital camera, or a recorded media player. In the embodiment of FIG. 17, an access point 2806 provides a signal via wireless interface 2808 to an input/output of the media viewer 2802 via a wireless interface 2810 interfaced to the remainder of the media viewer 2802 via communication interface 2714. As used herein, the term communication interface may be used to collectively refer to the wireless interface 2810 (e.g., an antenna as shown) and the radio and/or other interface to which it is connected. Media may be delivered across the communication interface in real time for viewing on the display 2704, or may alternatively be buffered by the microcontroller 2708 in local storage 2712. User controls comprising a user interface 2710 may be used to control the receipt and viewing of media. The media viewing system 2802 may for example be configured as a pocket media viewer, a cellular telephone, a portable Internet access device, or other wired or wireless device.

Although some of the embodiments have been described as using curved mirrors, according to an alternative embodiment, a diffractive optical element may be substituted for the curved mirrors described herein. It will be understood that, as modifications to the mirror shape such as adaptation to a Fresnel type mirror remain within the scope, so too does the adaptation to a diffractive element of arbitrary shape. In the interest of brevity and clarity, the term "curved mirror" will be understood to include such alternative mirror types.

Although the invention has been described with reference to the disclosed embodiments, persons skilled in the art will recognize that changes may be made in form and detail without departing from the spirit and scope of the invention. For example, although scanning of the various embodiments have been described with reference to "vertical" and "horizontal" directions, it will be understood that scanning along other orthogonal and non-orthogonal axes may be used instead. Such modifications are well within the skill of those ordinarily skilled in the art. Accordingly, the invention is not limited except as by the appended claims.

We claim:

1. A viewing system, comprising:
    an image source operable to transmit image signals; and
    a scanned beam display coupled to the image source to receive the image signals therefrom, the scanned beam display comprising:
        a light emitter array having a plurality of light sources operable to emit diverging light;
        an array of collimating elements, each of the collimating elements corresponding to at least one of the light sources and positioned to receive at least a portion of the diverging light emitted from the corresponding at least one of the light sources, each of the collimating elements configured to substantially collimate the received diverging light into respective beams; and
        an actuator system coupled to at least one of the light emitter array and the array of collimating elements, the actuator system being operable to move at least one of the light emitter array and the array of collimating elements to scan the respective beams to provide an image responsive to the image signals, wherein the image appears substantially fixed to a viewer as the viewer's eye moves relative to the array of collimating elements.

2. The viewing system of claim 1 wherein the image source comprises an image capture device.

3. The viewing system of claim 2 wherein the image capture device comprises a camera.

4. The viewing system of claim 1 wherein the image source is operable to transmit video image signals.

5. The viewing system of claim 1, further comprising a controller coupled to the image source, the controller operable to control the operation of the image source.

6. The viewing system of claim 1 wherein the image source comprises an Internet network operable to transmit the image signals to the scanned beam display.

7. The viewing system of claim 1 wherein the image source comprises an telephone network operable to transmit the image signals to the scanned beam display.

8. The viewing system of claim 1 wherein the image source comprises an cable network operable to transmit the image signals to the scanned beam display.

9. The viewing system of claim 1 wherein the image source comprises a satellite system operable to transmit the image signals to the scanned beam display.

10. The viewing system of claim 1 wherein the image source comprises a computer readable medium.

11. The viewing system of claim 1 wherein the image source is coupled to the scanned beam display via a wireless interface.

12. The viewing system of claim 1 wherein the image source is electrically coupled to the scanned beam display.

13. The viewing system of claim 1, further comprising a user interface configured to allow a user to select the image to be displayed by the scanned beam display.

14. The viewing system of claim 1 wherein the scanned beam display is included in a cellular telephone.

15. The viewing system of claim 1 wherein the scanned beam display is included in an Internet access device.

16. The viewing system of claim 1 wherein each of the collimating elements comprises a curved mirror.

17. The viewing system of claim 16 wherein the actuator system comprises a plurality of actuators, each of the actuators coupled to a corresponding one of the curved mirrors.

18. The viewing system of claim 17 wherein each of the actuators is operable to rotate the corresponding one of the curved mirrors about at least one axis.

19. The viewing system of claim 17 wherein each of the actuators is operable to move the corresponding one of the curved mirrors in at least one direction.

20. The viewing system of claim 16 wherein the actuator system comprises a plurality of actuators, each of the actuators coupled to a corresponding at least one of the light sources.

21. The viewing system of claim 20 wherein each of the actuators is operable to move the corresponding at least one of the light sources in at least one direction.

22. The viewing system of claim 20 wherein each of the actuators is operable to move the corresponding at least one of the light sources in a manner that maintains the corresponding at least one of the light sources substantially on a focal surface of the corresponding curved mirror.

23. The viewing system of claim 1 wherein the actuator system is operable to rotate the array of collimating elements and the light emitter array as a unit about at least one axis.

24. The viewing system of claim 1 wherein each of the collimating elements comprises a lens.

25. The viewing system of claim 24 wherein the actuator system comprises a plurality of actuators, each of the actuators coupled to a corresponding one of the lenses.

26. The viewing system of claims 25 wherein each of the actuators is operable to rotate the corresponding one of the lenses about at least one axis.

27. The viewing system of claims 25 wherein each of the actuators is operable to move the corresponding one of the lenses in at least one direction.

28. The viewing system of claim 1 wherein each of the collimating elements comprises a curved mirror and lens pair, the curved mirror positioned to reflect the emitted diverging light to the lens which is configured to substantially collimate the light reflected from the curved mirror.

29. The viewing system of claim 28 wherein the actuator system comprises a plurality of actuators, each of the actuators coupled to a corresponding one of the curved mirrors.

30. The viewing system of claims 29 wherein each of the actuators is operable to rotate the corresponding one of the curved mirrors about at least one axis.

31. The viewing system of claims 29 wherein each of the actuators is operable to move the corresponding one of the curved mirrors in at least one direction.

32. The viewing system of claim 28 wherein the actuator system comprises a plurality of actuators, each of the actuators coupled to a corresponding one of the lenses.

33. The viewing system of claims 32 wherein each of the actuators is operable to rotate the corresponding one of the lenses about at least one axis.

34. The viewing system of claims 32 wherein each of the actuators is operable to move the corresponding one of the lenses in at least one direction.

35. The viewing system of claim 28 wherein the actuator system comprises a plurality of actuators, each of the actuators coupled to a corresponding at least one of the light sources.

36. The viewing system of claim 35 wherein each of the actuators is operable to move the corresponding at least one of the light sources in a manner that maintains the corresponding at least one of the light sources substantially on a focal surface defined by the corresponding curved mirror and lens pair.

37. The viewing system of claim 1 wherein the actuator system comprises a plurality of actuators, each of the actuators coupled to a corresponding one of the collimating elements.

38. The viewing system of claim 1 wherein each of the respective beams is laterally spaced apart from an adjacent beam.

39. The viewing system of claim 1 wherein each of the beams abuts an adjacent beam.

40. The viewing system of claim 16 wherein each of the curved mirrors has a focal surface, and the at least one corresponding light sources are positioned substantially at the corresponding focal surface.

41. The viewing system of claim 40 wherein each of the curved mirrors is a spherical mirror and the focal surface is a focal sphere.

42. The viewing system of claim 1 wherein at least one of the light sources comprises one of a single monochrome source, a plural monochrome source, an RGB triad, and an RGBG quadrad.

43. The viewing system of claim 1 wherein at least one of the light sources comprises one of an organic light emitting diode, a surface emitting light emitting diode, an edge emitting light emitting diode, a laser diode, a dpss laser, photoluminescent spot, a reflector, and a fiber-optic source.

44. The viewing system of claim 1 wherein the array of collimating elements comprises an at least partially transparent array of collimating elements.

45. The viewing system of claim 16 wherein each of the curved mirrors comprises a spherical mirror.

46. The viewing system of claim 16 wherein each of the curved mirrors comprises a Fresnel mirror.

47. The viewing system of claim 16 wherein each of the curved mirrors comprises a diffractive mirror.

48. The viewing system of claim 1 wherein the actuator system and the light emitter array are operable to synchronously scan each of the respective beams.

49. The viewing system of claim 1 wherein the actuator system and the light emitter array are operable to asynchronously scan each of the respective beams.

50. The viewing system of claim 1 wherein the actuator system is operable to scan each of the respective beams so that each of the collimating elements provides an identical image.

51. A method of providing an image to a viewer, comprising:
   transmitting image signals from an image source to a scanned beam display including a plurality of light sources and an array of collimating elements;
   emitting light from the plurality of light sources;
   substantially collimating the light emitted from each of the light sources using a corresponding one of the collimating elements to form respective beams; and
   scanning the respective beams to provide the image to the viewer, the image appearing substantially fixed to the viewer as a viewer's eye moves relative to the array of collimating elements.

52. The method of claim 51 wherein the act of transmitting image signals from an image source to a scanned beam display including a light source and a curved reflecting surface comprises transmitting the image signals corresponding to an image captured with an image capture device.

53. The method of claim 51 wherein the act of transmitting image signals from an image source to a scanned beam display including a light source and a curved reflecting surface comprises transmitting the image signals over a wireless communication network.

54. The method of claim 51 wherein the act of transmitting image signals from an image source to a scanned beam display including a light source and a curved reflecting surface comprises transmitting the image signals over an Internet network.

55. The method of claim 51 wherein the act of transmitting image signals from an image source to a scanned beam display including a light source and a curved reflecting surface comprises transmitting the image signals over a cable network.

56. The method of claim 51 wherein the act of transmitting image signals from an image source to a scanned beam display including a light source and a curved reflecting surface comprises transmitting the image signals over a television network.

57. The method of claim 51 wherein the act of transmitting image signals from an image source to a scanned beam display including a light source and a curved reflecting surface comprises transmitting the image signals from a satellite.

58. The method of claim 51 wherein the act of transmitting image signals from an image source to a scanned beam display including a light source and a curved reflecting surface comprises transmitting the image signals from a computer readable medium having image data stored thereon.

59. The method of claim 51 wherein each of the collimating elements comprise curved reflecting surfaces and wherein the act of substantially collimating the light emitted from each of the light sources from corresponding collimating elements to form respective beams comprises reflecting the light emitted from each of the light sources from a corresponding one of the curved reflecting surfaces.

60. The method of claim 51 wherein each of the collimating elements comprise a curved reflecting surface and lens pair and wherein the act of substantially collimating the light emitted from each of the light sources using a corresponding one of the collimating elements to form respective beams comprises reflecting the light emitted from each of the light sources from a corresponding one of the curved reflecting surfaces and passing the reflected light through a corresponding one of the lenses.

61. The method of claim 51 wherein each of the collimating elements comprise at least one lens and wherein the act of substantially collimating the light emitted from each of the light sources using a corresponding one of the collimating elements to form respective beams comprises passing the light emitted from each of the light sources through a corresponding one of the lenses.

62. The method of claim 51 wherein the act of scanning the respective beams to provide an image to the viewer comprises moving each of the light sources and the corresponding collimating elements relative to each other.

63. The method of claim 62 wherein each of the collimating elements comprises a curved reflecting surface and wherein the act of moving each of the light sources and corresponding collimating elements relative to each other comprises moving each of the light sources along a path substantially on a focal surface of the corresponding curved reflecting surface.

64. The method of claim 62 wherein each of the collimating elements comprises a curved reflecting surface and wherein the act of moving the each of the light sources and corresponding collimating elements relative to each other comprises rotating each of the curved reflecting surfaces about at least one axis.

65. The method of claim 62 wherein each of the collimating elements comprises a curved reflecting surface and wherein the act of moving the each of the light sources and corresponding collimating elements relative to each other comprises moving each of the curved reflecting surfaces in at least one direction.

66. The method of claim 51 wherein the act of scanning the respective beams to provide an image to the viewer comprises rotating the plurality of light sources and the corresponding collimating elements as a unit about at least one axis.

67. The method of claim 62 wherein each of the collimating elements comprises a lens and wherein the act of moving each of the light sources and corresponding collimating elements relative to each other comprises moving each of the light sources while each of the lenses is maintained substantially stationary.

68. The method of claim 62 wherein each of the collimating elements comprises a lens and wherein the act of moving the each of the light sources and corresponding collimating elements relative to each other comprises rotating each of the lenses about at least one axis.

69. The method of claim 62 wherein each of the collimating elements comprises a lens and wherein the act of moving the each of the light sources and corresponding collimating elements relative to each other comprises moving each of the lenses in at least one direction.

70. The method of claim 62 wherein each of the collimating elements comprise a curved reflecting surface and lens pair and wherein the act of moving each of the light sources and corresponding collimating elements relative to each other comprises moving each of the light sources along a path substantially on a focal surface defined by the corresponding curved reflecting surface and lens pair.

71. The method of claim 51 wherein the act of scanning the respective beams to provide an image to the viewer comprises rotating the plurality of light sources and the corresponding collimating elements as a unit about at least one axis.

72. The method of claim 51, further comprising scanning each of the beams synchronously.

73. The method of claim 51, further comprising scanning each of the beams asynchronously.

74. The method of claim 51, further comprising modulating the plurality of light sources.

* * * * *